Nov. 5, 1929.    W. F. HENDRICKS    1,734,855
ANIMAL TRAP
Filed Jan. 14, 1929    2 Sheets-Sheet 1

W. F. Hendricks, INVENTOR
BY Victor J. Evans
ATTORNEY

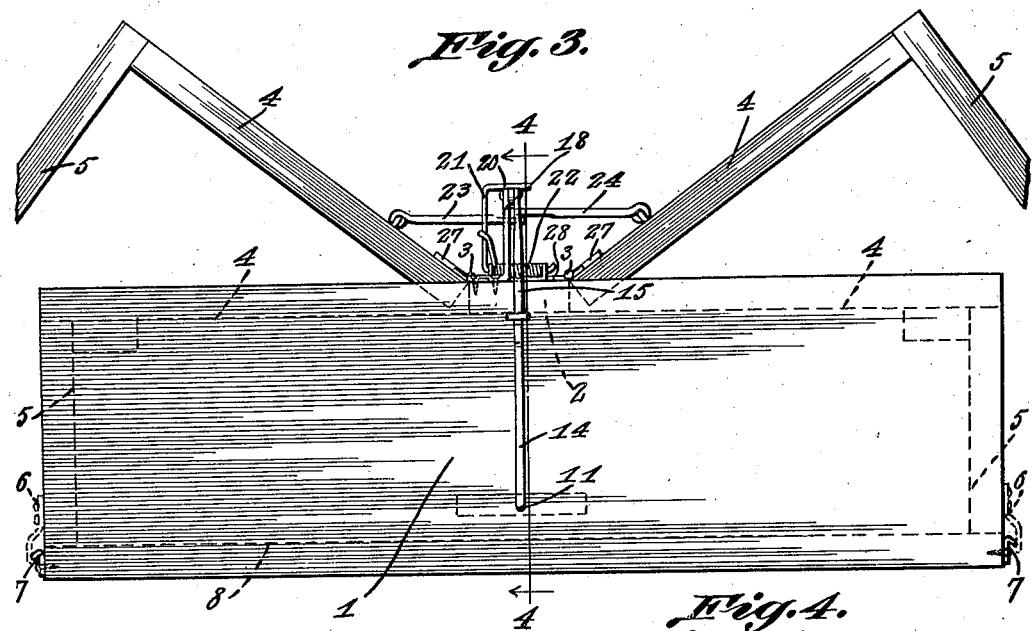
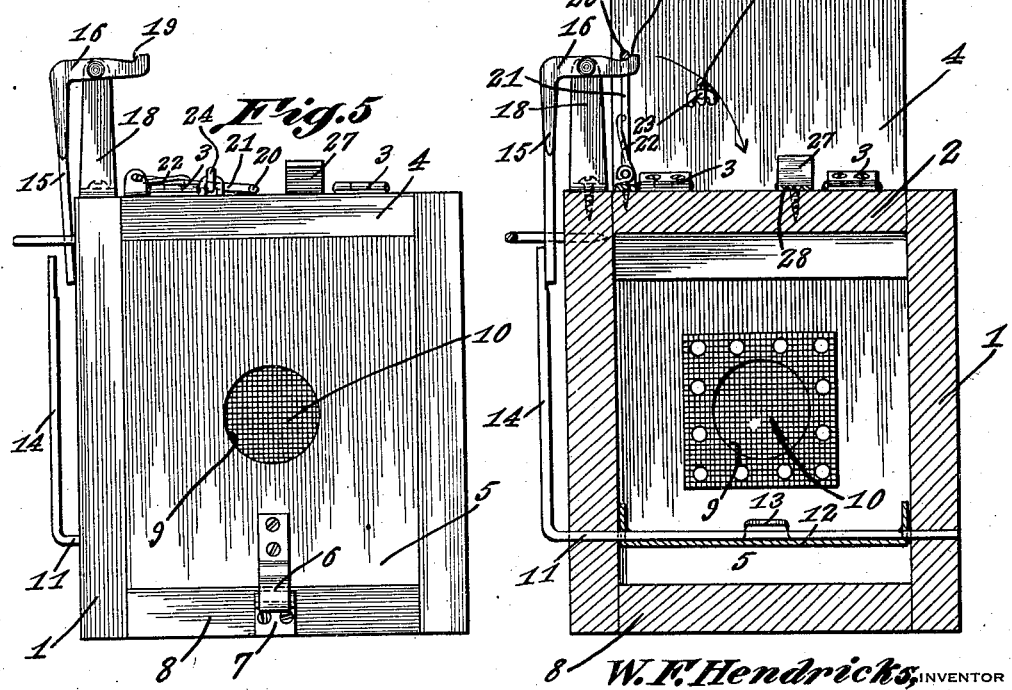

Patented Nov. 5, 1929

1,734,855

UNITED STATES PATENT OFFICE

WILLIAM FLOYD HENDRICKS, OF RICHMOND, VIRGINIA, ASSIGNOR OF ONE-THIRD TO FELIX A. BASCHON, OF RICHMOND, VIRGINIA

ANIMAL TRAP

Application filed January 14, 1929. Serial No. 332,402.

The object of this, my present invention, is the provision of a trap for catching live animals and which is of such construction that the animal cannot escape from the trap or injure himself while trapped.

A further object is the provision of a trap that comprises a substantially rectangular member having a portion of its top and its ends open, the said portions being provided with substantially L-shaped hinged members which, when the trap is swung by the contact of the animal with the bait pan arranged therein will gravitate to closed position and will be automatically locked so that the escape of the animal will be thus prevented, the ends of the trap being provided with openings that are covered by wire nettings which serve both as peep-holes and permit of the circulation of air through the trap when the animal is trapped therein.

A still further and important object is the provision of means for setting the trap in a manner which cannot inflict injury to the trapper, the said means being of a sensitive nature to insure the closing of the trap upon a slight swinging of the bait pan which is arranged in the trap.

To the attainment of the foregoing and other objects which will present themselves, the improvement also resides in certain other novel features of construction, combination and operative association of parts, one satisfactory embodiment of which is disclosed by the accompanying drawings.

In the drawings:

Figure 3 is a side elevation of the improvement showing the trap open.

Figure 4 is a transverse sectional view on the line 4—4 of Figure 3.

Figure 5 is an end view of the trap closed.

Figure 1:
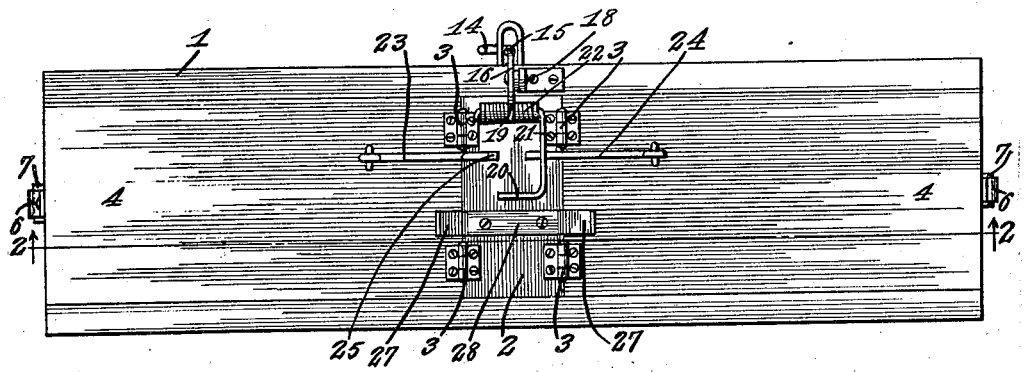
Figure 1 is a top plan view of a trap constructed in accordance with this invention.

My improved trap may be constructed of any desired material and as disclosed by the drawings comprises a substantially rectangular member 1 that has both of its ends open and its top, for a suitable distance from the said open ends likewise open. The division plate which connects the sides of the open body 1 is indicated for distinction by the numeral 2 and to this plate there are hinged, as at 3, respectively, the longer members of right angle elements. These longer elements are indicated for distinction by the numeral 4 and the shorter and outer parts thereof are indicated by the numeral 5. Each of the elements 4 and 5 is designed to close the open top and the ends of the trap, the elements 5 being provided with spring clips 6 to engage with spring catches 7 that are fixed on the bottom 8 of the trap body. The members 5 are also provided with a central preferably round opening 9 that is covered by a reticulated plate 10.

Figure 2:
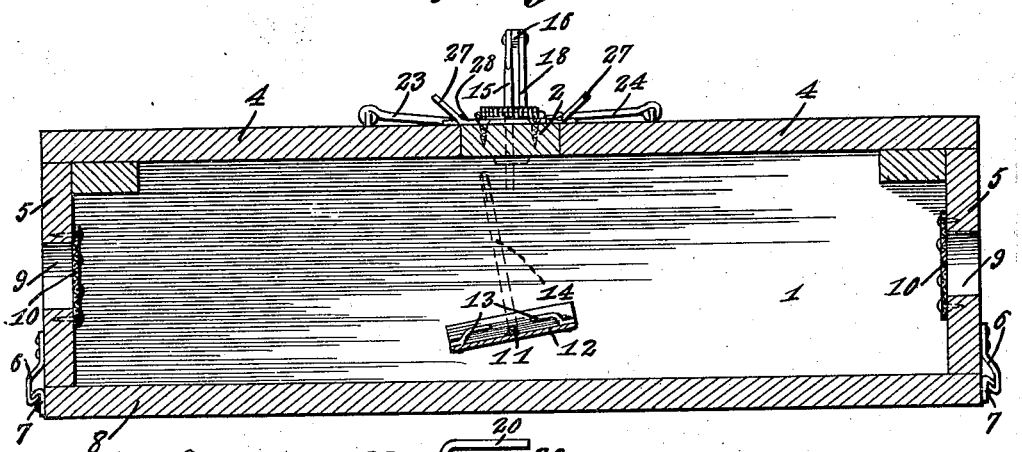
Figure 2 is a sectional view on the line 2—2 of Figure 1.
Figure 6:
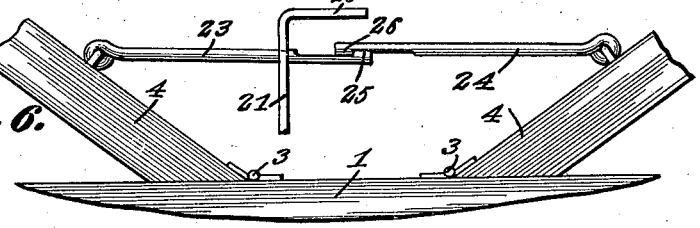
Figure 6 is an enlarged detail elevation to illustrate the manner in which the closures for the trap are held in open position.

Arranged transversely through the body 1, adjacent to the bottom 8 of the trap, and at the center thereof, there is journaled in suitable openings a shaft 11. This shaft has fixed thereon a bait pan 12. As disclosed by Figure 2 of the drawings, the bait pan is flanged and has on its bottom hooks 13 whereby the bait may be effectively sustained thereon. The shaft 11 terminates in a right angle arm 14 which is arranged adjacent to one side of the body 1. This arm has its end, on its inner face flattened and is designed to engage with the flattened surface on the depending arm 15 of a right angular member in the nature of a trip. The right angle arm 16 of the trip is pivotally supported between upstanding brackets 18 fixed on the top, adjacent one edge of the body 1. The horizontal arm of the trip has a depressed portion 19 which, when the trap is open, is engaged by the offset end 20 of a rod or arm 21 that is pivotally connected to the member 2 of the body and which is influenced by a spring 22 in the direction of the arrow disclosed by Figure 4 of the drawings. Loosely pivoted to the elements 4 there are arms or rods 23 and 24, respectively. Each of these rods has its confronting face for a suitable distance from its ends notched or depressed to form the same with lugs 25 and 26 which are designed for coengagement for holding the elements 4 and 5, which comprise the doors of the trap, in open position.

The doors of the trap are limited in open position by contact with the angle ends 27 of a plate 28 which is screwed or otherwise secured on the element 2. The doors are of sufficient weight to swing to closed and latched position when the trap is sprung. The trap is sprung by an animal entering one of the ends of the body 1 and contacting and swinging the bait pan 12. This will bring the angle arm 14 of the shaft 11 out of contact with the arm 15 of what I have termed the trip. The pivotally secured angle rod 21 will now be influenced by the spring 22, causing the same to swing in the direction of the arrow in Figure 4. The swinging of this rod will contact with the rods 23 and 24 and bring the lugs 25 and 26 thereon out of engagement with each other, which of course, permits the doors of the trap to gravitate to closed position and thereby effectively trap an animal without injuring the same. When the doors are closed the trapper can observe through the peepholes 9 the type of animal trapped and obviously by bringing the catch 6 on one of the doors out of engagement with the keeper 7 the trap, when lifted and inverted will cause the trapped animal to gravitate into a bag or other receptacle.

The construction is simple and the advantages thereof will, it is thought, be understood and appreciated by those skilled in the art to which such invention relates so that further detailed description will not be required. Obviously I do not wish to be restricted to the precise details herein set forth and, therefore, hold myself entitled to make such changes therefrom as fairly fall within the scope of what I claim.

Having described the invention, I claim:

1. An animal trap comprising a body having open ends, weighted doors hinged to the top of the body, catch means between the doors and the bottom of the body, rods having lug ends loosely connected to the doors, and the lugs of the said rods designed for interengagement to hold the rods in alinement and the doors open, a bait pan journaled in the body and means operated upon the swinging of the bait pan for breaking the joint between the rods to permit of the doors swinging to closed and latched position.

2. An animal trap comprising a body having open ends and a partly open top, weighted angle doors having their upper portions hinged to the top, spring catch means between the doors and the bottom of the body, rods loosely connected to the upper portions of the doors and having lug ends designed for interengagement to hold the doors open, a bait pan journaled in the body and means operated upon the swinging of the bait pan for forcing the rods away from each other to permit of the doors swinging to closed and latched positions.

3. An animal trap, comprising a body having open ends and a top which is also open except at the center thereof, right angular members providing doors hingedly secured to the top, spring catch means between the doors and the bottom of the body, a shaft journaled transversely through the body having a bait pan secured thereon and said shaft having an angle arm arranged along one side of the body, an angle trip member pivotally supported on the body for contacting with the said arm of the shaft, a spring influenced rod engaging the trip member for holding the same in contact with the arm, loosely pivoted rods on the upper elements of the doors having notched ends for coengagement for holding the rod members in alinement and the doors open, and said rods being in the path of contact with the spring influenced element for breaking the joint therebetween and for permitting the doors to close by gravity when the bait pan is swung.

4. An animal trap, comprising a body having open ends and a top which is also open except at the center thereof, right angular members providing doors hingedly secured to the top, spring catch means between the doors and the bottom of the body, a shaft journaled transversely through the body having a bait pan secured thereon and said shaft having an angle arm arranged along one side of the body, an angle trip member pivotally supported on the body for contacting with the said arm of the shaft, a spring influenced rod engaging the trip member for holding the same in contact with the arm, loosely pivoted rods on the upper elements of the doors having notched ends for coengagement for holding the rod members in alinement and the doors open, and said rods being in the path of contact with the spring influenced element for breaking the joint therebetween and for permitting the doors to close by gravity when the bait pan is swung, and means for limiting the opening of the doors.

5. An animal trap, comprising a body having open ends and a top which is also open except at the center thereof, right angular members providing doors hingedly secured to the top, spring catch means between the doors and the bottom of the body, a shaft journaled transversely through the body having a bait pan secured thereon and said shaft having an angle arm arranged along one side of the body, an angle trip member pivotally supported on the body for contacting with the said arm of the shaft, a spring influenced rod engaging the trip member for holding the same in contact with the arm, loosely pivoted rods on the upper elements of the doors having notched ends for coengagement for holding the rod members in alinement and the doors open, and said rods being in the path of contact with the spring influenced element for breaking the joint therebetween and for permitting the doors to close by gravity when the bait pan is swung and means for limiting the opening of the doors and each of said doors having screen protected peep openings.

In testimony whereof I affix my signature.

WILLIAM FLOYD HENDRICKS.